E. A. NELSON.
BRAKE.
APPLICATION FILED JULY 16, 1909.

970,738.

Patented Sept. 20, 1910.

Witnesses

Inventor
Emil A. Nelson

UNITED STATES PATENT OFFICE.

EMIL A. NELSON, OF DETROIT, MICHIGAN, ASSIGNOR TO HUPP MOTOR CAR COMPANY, OF DETROIT, MICHIGAN, A CORPORATION OF MICHIGAN.

BRAKE.

970,738.

Specification of Letters Patent.

Patented Sept. 20, 1910.

Application filed July 16, 1909. Serial No. 508,030.

*To all whom it may concern:*

Be it known that I, EMIL A. NELSON, a citizen of the United States of America, residing at Detroit, in the county of Wayne and State of Michigan, have invented certain new and useful Improvements in Brakes, of which the following is a specification, reference being had therein to the accompanying drawings.

The invention relates to brake mechanisms more particularly designed for application to motor vehicles, and the invention consists in certain features of construction as hereinafter set forth.

Figure 1:
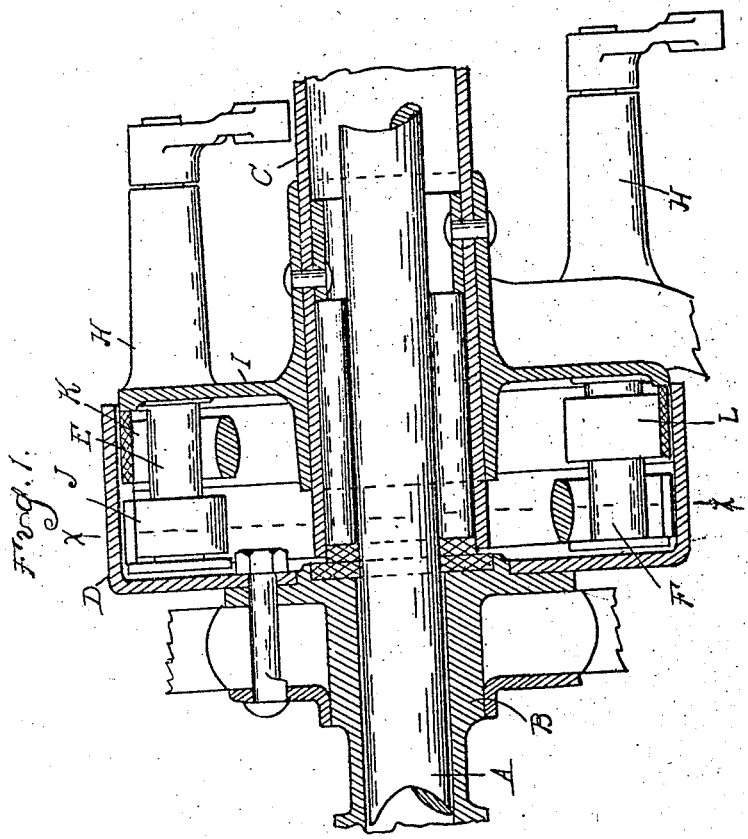
Figure 2:
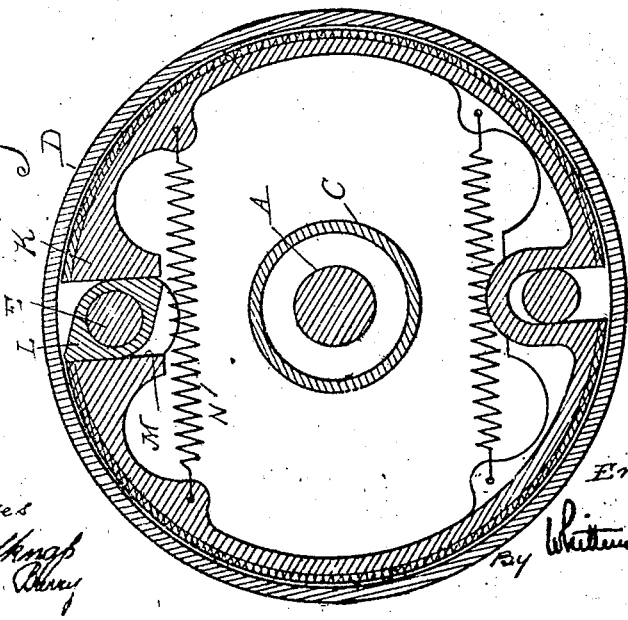

In the drawings: Figure 1 is a horizontal section through the brake in the plane of the axle; and Fig. 2 is a vertical section on line $x$—$x$, Fig. 1.

A is the axle of a motor vehicle, B the wheel hub, C the axle housing and D the brake drum preferably secured to the wheel.

It is usual with motor vehicles to provide two independently operable brake mechanisms—one for normal use and the other for use in a case of emergency. With the present construction, these two independent brakes are both arranged within the drum D, and are constructed for mutual coöperation as follows: E and F are two rock shafts for operating the respective brakes arranged upon diametrically opposite sides of the drum and parallel to the axle. These shafts are preferably journaled in bearings H, which are integral with a circular enlargement I of the axle housing C, which, together with the drum D, form a housing for the brakes. The brake shoes are formed of split annular members J and K arranged side by side within the drum D and adapted when expanded to contact with the inner face thereof. Each of these shoes is centrally pivoted respectively upon the rock shafts E and F, while the split or space between the ends of the shoes registers with the opposite shaft. L are cams on the shafts E and F for engaging with bearings M at the opposite ends of said shoes, the arrangement being such that a rocking of the cam will cause a separation of said bearings and expansion of the shoes.

With the construction as described, in operation the rocking of either of the shafts E or F will cause the expansion of its corresponding shoe and the application of the brake; the other shaft serving as a pivot bearing and anchor for the shoe. Upon the reverse rotation of the cam, the shoes are released and springs N, which connect their opposite ends, will draw them from frictional contact with the brake drum. Furthermore, the engagement of said shoes with the two diametrically opposite points of support formed by the two shafts will hold them from accidental contact with the surface of the drum.

Another advantage of the construction is that the brake shoes J and K are the same in construction and are interchangeable. Thus if in the operation of the machine the shoe for the main brake should be broken or in any way inoperative it could be removed and replaced by the shoe for the emergency brake, which can be used until another shoe is obtained.

What I claim as my invention is:

1. A brake mechanism comprising a brake drum, a pair of adjacent expansible brake shoes arranged within said drum, and rock shafts for respectively expanding said shoes arranged on diametrically opposite sides of the drum, each shaft constituting an anchor for the opposite shoe.

2. A brake mechanism comprising a brake drum, a pair of adjacent split annular brake shoes arranged within said drum, with their points of severance upon opposite sides thereof, cams for expanding said shoes arranged in the splits thereof, and cam shafts for said cams, each constituting a pivot anchor for the opposite shoe.

3. A brake mechanism comprising a brake drum, a stationary head forming a closure for said drum, a pair of adjacent split annular brake shoes arranged within said drum, shafts journaled in said stationary head upon diametrically opposite sides thereof, each forming a central pivotal anchor for one of the shoes, and cams on said shafts for expanding the opposite shoe.

4. A brake mechanism comprising a brake drum, a pair of brake shoes therein, and means for independently operating said shoes, the operating means of each shoe constituting an anchor for the other shoe.

In testimony whereof I affix my signature in presence of two witnesses.

EMIL A. NELSON.

Witnesses:
 CHAS. D. HASTINGS,
 JOHN E. BAKER.